(12) United States Patent
Truesdell et al.

(10) Patent No.: US 11,759,663 B1
(45) Date of Patent: Sep. 19, 2023

(54) BUCKET HOOK WITH TETHER HOLE

(71) Applicant: Buckingham Manufacturing Company, Inc., Binghamton, NY (US)

(72) Inventors: Kevin Truesdell, Binghamton, NY (US); James Pennefeather, Johnson City, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 0 days.

(21) Appl. No.: 17/104,198

(22) Filed: Nov. 25, 2020

Related U.S. Application Data

(60) Provisional application No. 62/940,399, filed on Nov. 26, 2019.

(51) Int. Cl.
*A62B 35/00* (2006.01)
*F16B 45/00* (2006.01)

(52) U.S. Cl.
CPC .......... *A62B 35/0075* (2013.01); *F16B 45/00* (2013.01)

(58) Field of Classification Search
CPC .... A62B 35/007; A62B 35/0075; F16B 45/00
See application file for complete search history.

(56) References Cited

U.S. PATENT DOCUMENTS

| | | | |
|---|---|---|---|
| D307,384 S * | 4/1990 | Phillips | D8/367 |
| 4,957,259 A * | 9/1990 | Wolf, Jr. | A47F 5/0006 211/119 |
| 5,113,552 A * | 5/1992 | Payer | F16B 45/00 24/129 R |
| 6,250,595 B1 * | 6/2001 | Campbell | E06C 7/146 182/129 |
| 6,575,416 B1 * | 6/2003 | Avinger | A47G 25/0614 248/215 |
| 9,166,385 B2 * | 10/2015 | Newman | F16B 45/00 |
| 10,123,645 B2 * | 11/2018 | Bacallao | A47G 25/0614 |
| 10,344,793 B2 * | 7/2019 | Choate | F16B 45/00 |
| 11,280,366 B1 * | 3/2022 | Nielsen | F16B 45/034 |
| 2007/0158517 A1 * | 7/2007 | King | A47F 5/0006 248/301 |
| 2009/0230267 A1 * | 9/2009 | Ernst | A47L 13/16 248/231.9 |
| 2011/0114806 A1 * | 5/2011 | Losaw | F16B 45/02 248/225.21 |
| 2019/0082863 A1 * | 3/2019 | Kressin | F16M 11/046 |
| 2022/0065286 A1 * | 3/2022 | Nielsen | F16B 45/055 |

* cited by examiner

*Primary Examiner* — Robert Sandy
*Assistant Examiner* — Louis A Mercado
(74) *Attorney, Agent, or Firm* — BOND, SCHOENECK & KING, PLLC

(57) ABSTRACT

According to an embodiment the bucket hook including a body formed by a first arm, a second arm, and a bucket receiving portion extending along a first longitudinal axis which joins the first and second arms, the first and second arms each contain a first elongated portion extending from respective ends of the bucket receiving portion in the same direction and at an angle to the first longitudinal axis and defining a channel therebetween; and a hole defined by the first arm. The bucket hook is dimensioned to go over the side of a bucket on a bucket truck or elevated lift. These features allow a worker to carry more tools to a significant height in order to carry out tasks while preventing accidents.

9 Claims, 8 Drawing Sheets

BUCKET HOOK WITH TETHER HOLE

REFERENCE TO RELATED APPLICATIONS

The present application relates and claims priority to U.S. Provisional Application No. 62/940,399, filed Nov. 26, 2019, the entirety of which is hereby incorporated by reference.

BACKGROUND

The present disclosure relates generally to hooks. More particularly, to hooks for buckets of bucket trucks or elevated lifts.

Arborists, climbers, utility linemen, and other workers often must be elevated to significant heights while carrying substantial tools in order to carry out repairs, maintenance, and installation tasks. Many workers will use a bucket such as that on a bucket truck or elevated lift in order to be raised up in the air. However, these buckets are limited in their size and ability to carry tools as well as the worker. Therefore, many workers will use bucket hooks, which are placed the side of the bucket. A bucket hook can be used to hang tools and other items inside and outside of the bucket.

Conventional bucket hooks are limited in the amount of weight and tools that they can hold and often tools or accessories will fall from the hooks. Falling tools is a significant problem for workers, if a tool falls off the bucket hook when the bucket is raised it will likely break or injure someone on the ground. Workers need a bucket hook that can hold a lot of weight, many different items, and prevent dropped tools.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY

Embodiments of the present invention recognize the problems and shortcomings of conventional bucket hook devices discussed above. One embodiment of the bucket hook device solves the above-mentioned problems by providing a bucket hook having a bucket receiving portion, a pair of arms, and a tether hole positioned in and/or formed in part or in whole by at least one arm and designed to attach a tether and/or other articles thereto. According to an aspect, a bucket hook device of an embodiment including a tether hole is configured to prevent dropping of tools attached thereto (tool fall protection) by being shaped and dimensioned to accept a tether therethrough. A bucket hook according to another aspect is configured to hold an increased number of tools by providing, in addition to a tether hole, at least one hook on an arm of the body to allow workers to hook and better hold a wide variety of items a worker positioned inside a bucket may need including, but not limited to, tools, tool aprons, tool boards, slings or blocks. According to another aspect, a bucket hook device of an embodiment can include hooks positioned on one or both arms of various sizes with various sized openings, of the same size or a combination thereof (including multiples of various sizes and/or multiples of the same size hooks). At least one of the hooks can be a hook that is larger and has a larger opening as compared to hooks on conventional bucket hook devices. In accordance with another embodiment, a bucket hooks is provided that solves the problem of dropped tools by having an optional added gate positioned over and closing a hook opening to secure items in the opening of a hook. These features allow a worker to carry more tools to a significant height in order to carry out tasks while preventing accidents.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments.

Reference is now made briefly to the accompanying drawings, in which.

DETAILED DESCRIPTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
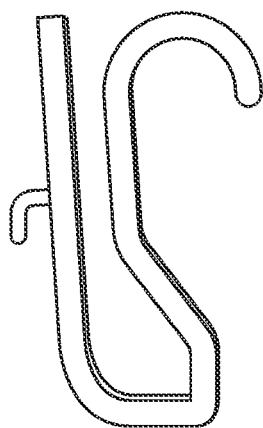
FIG. 1 is a prior art conventional bucket hook.

In FIG. 1, there is shown a prior art example of a conventional bucket hook.

Figure 2:
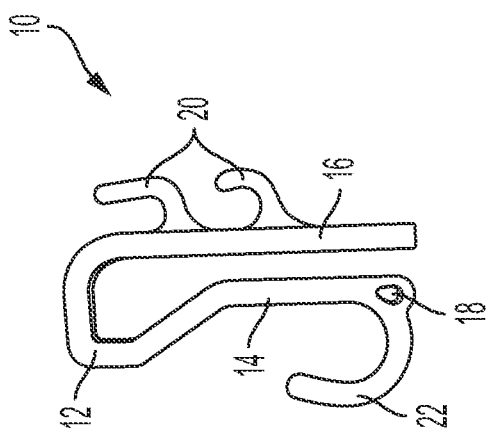
FIG. 2 is a perspective view of an example of a bucket hook with a tether hole in accordance with an embodiment.

In FIG. 2 there is shown a bucket hook in accordance with an embodiment, referred to generally by reference numeral 10. According to this embodiment, bucket hook 10 generally includes, without limitation, a body having a first arm 14, a second arm 16, a bucket receiving portion 12 connecting the first arm 14 to the second arm 16 and a tether hole 18. Bucket hook 10 is generally u-shaped and is structured, shaped and configured to hang on the side of a bucket of a bucket truck or an elevated lift (as shown and described with respect to FIGS. 4-10). As shown, one or both of the first arm 14 and the second arm 16 can be straight, rounded, angled, arcuate, and/or contoured or a combination thereof to be effectively utilized as described herein and as should be understood by a person of ordinary skill in the art in conjunction with a review of this disclosure. Depending on the outer perimeter, overhang, and/or flanges positioned at the opening of a bucket, the bucket hook 10 of an embodiment can include arms that are sufficiently rounded, angled, and/or contoured to fit snugly on the bucket while holding various tools, accessories and implements (as should be understood by a person of ordinary skill in the art in conjunction with a review of this disclosure).

Tether hole 18 can be formed by or through the bucket hook body including by or through either or both arms, by or through a hook extending from an arm, or by or through the bucket receiving portion 12. As shown in FIG. 2, tether hole is formed through first arm 14. Tether hole 18 is structured and configured to receive a tether (as should be known and understood by a person of ordinary skill in the art in conjunction with a review of this disclosure) to carry/hold fall protection tools or accessories, for example. In the example shown tether hole 18 is D-shaped but it can be any size or shape such that it can receive and effectively hold a tether. Tether hole 18 can also be positioned at any height along either or both arms and on an interior or exterior surface of the arms.

Bucket hook 10 can also include, but is not limited to, hooks positioned on or formed as part of the first arm 14 and/or the second arm 16, which can be used for hanging tools and other accessories, for example, from the hooks positioned adjacent to or in contacting relation to the inside surface and/or outside surface of a bucket. The hooks are configured to keep items secured to the bucket hook device and to prevent such items from falling and to provide easy access to the same by a worker positioned inside the bucket. As shown in FIG. 2, for example, at least one accessory hook 20 extends outwardly from the second arm 16. Accessory hook 20 is dimensioned to hang tools and other items on the inside of the bucket. In another embodiment, having a plurality of accessory hooks 20 allows users to hang more than one item on the inside of the bucket. These hooks 20 can hold items such as but not limited to tools, tool aprons, and tool boards, extra slings or blocks. In an embodiment, accessory hook 20 is configured to hold 15 pounds WLL (3:1 safety factor). Bucket hook 10 can have one or more accessory hooks 20 on either or both arms. In one example the accessory hook 20 has a ¾" inside opening, however accessory hooks 20 can be any size or shape with any size opening. In examples of bucket hooks 10 with a plurality of accessory hooks 20 the hooks can all be the same or of varying sizes and shapes.

In another embodiment, bucket hook 10 can further include, but is not limited to, an accessory hook 22 extending from the first arm. This hook 22 can be of the same or of a different size and shape as compared to accessory hook 20. As shown, the hook 22 is larger than accessory hook 20, and can be used for hanging items on the outside of a bucket. The large hook 22 of the bucket hook with tether hole 10 in one example is larger than hooks of conventional bucket hooks. In one embodiment, large hook 22 has a 2½" hook opening and can hold 40 pounds WLL (3:1 safety factor), however it can be in any size or shape. Bucket hook 10 can have one or more accessory hook 22 on either or both arms. In examples with plurality of accessory hooks 22 the hooks can all be the same or of varying sizes and shapes.

Figure 3:
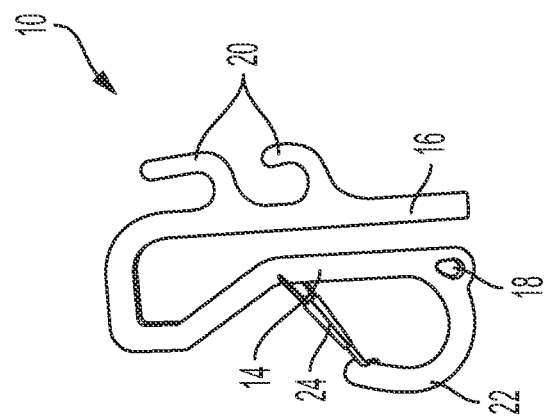
FIG. 3 is a perspective view of an example of a bucket hook with a tether hole in accordance with an embodiment.

Turning to FIG. 3, another example of bucket hook 10 is illustrated in accordance with an embodiment. In particular, this bucket hook 10 can include an additional or alternative hole 28. Hole 28 can be formed by one of the arms and/or hooks. In the embodiment shown, hole 28 is formed of first arm 14, hook 22, and gate 24 which covers the opening of hook 22 in a closed position. Gate 24 is pivotably attached to first arm 14, and can pivot from a closed position to an open position and back to a closed position. Here, the gate 24 can be pivotably connected at its first end to the first arm (where it is positioned through the first arm), and its second end that contacts the distal end of the hook 22 in a closed position can be moved down toward the first arm 14 a distance from the connection point of the first end to the first arm, gate 24 can also pivot in other directions (as should be understood by a person of ordinary skill in the art in conjunction with a review of this disclosure). Gate 24 can be attached to other portions of bucket hook 10, for example, the gate 24 can be attached to the distal end of the hook 22. The gate 24 can be biased to close via a spring or other mechanism (not shown), and can frictionally connect, clip or otherwise catch or latch onto the distal end of the hook 22 (as should be understood by a person of ordinary skill in the art in conjunction with a review of this disclosure). When closed, gate 24 blocks the opening of large hook 22. Opening or hole 28 can be used in a similar manner to the hooks and/or the tether hole. When closed, gate 24 further prevents tools and items from coming off large hook 22. In one embodiment, the gate can be a stainless-steel wire gate with a rubber grip. In accordance with a further embodiment, bucket hook 10 can include one or more hooks 20 in addition to hole 28 and/or tether hole 18. Accessory hook 20 can also have a gate 24.

When in use with a bucket, the bucket receiving portion 12 can fit over the lip or top perimeter the bucket opening and first arm 14 and second arm 16 hang and are adjacent to or contacting (partially or wholly) respective inside and the outside surfaces of the bucket. In one preferred embodiment, the bucket receiving portion 12 can fit up to a 2½" bucket lip. Bucket hook 10 can also be placed on walls or features other than a bucket and be similarly utilized.

Figure 4:
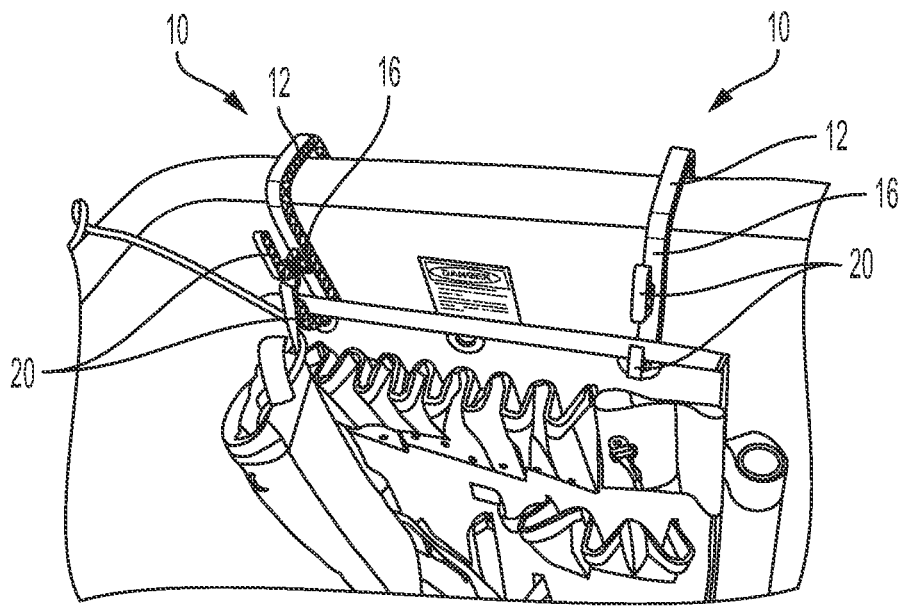
FIG. 4 is a perspective view of an example of a bucket hook with a tether hole in use on a bucket truck in accordance with an embodiment.
Figure 5:
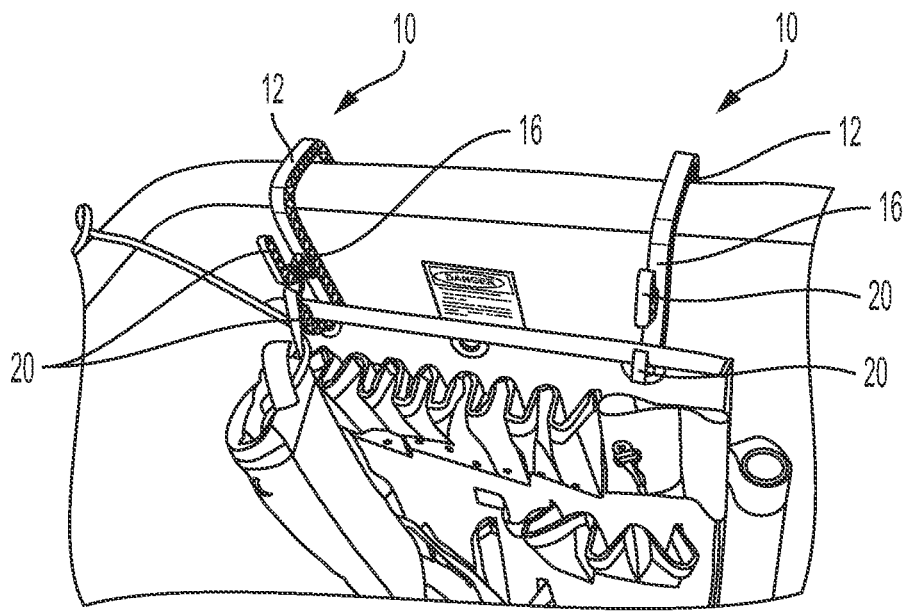
FIG. 5 is a perspective view of an example of a bucket hook with a tether hole in use on a bucket truck in accordance with an embodiment.
Figure 6:
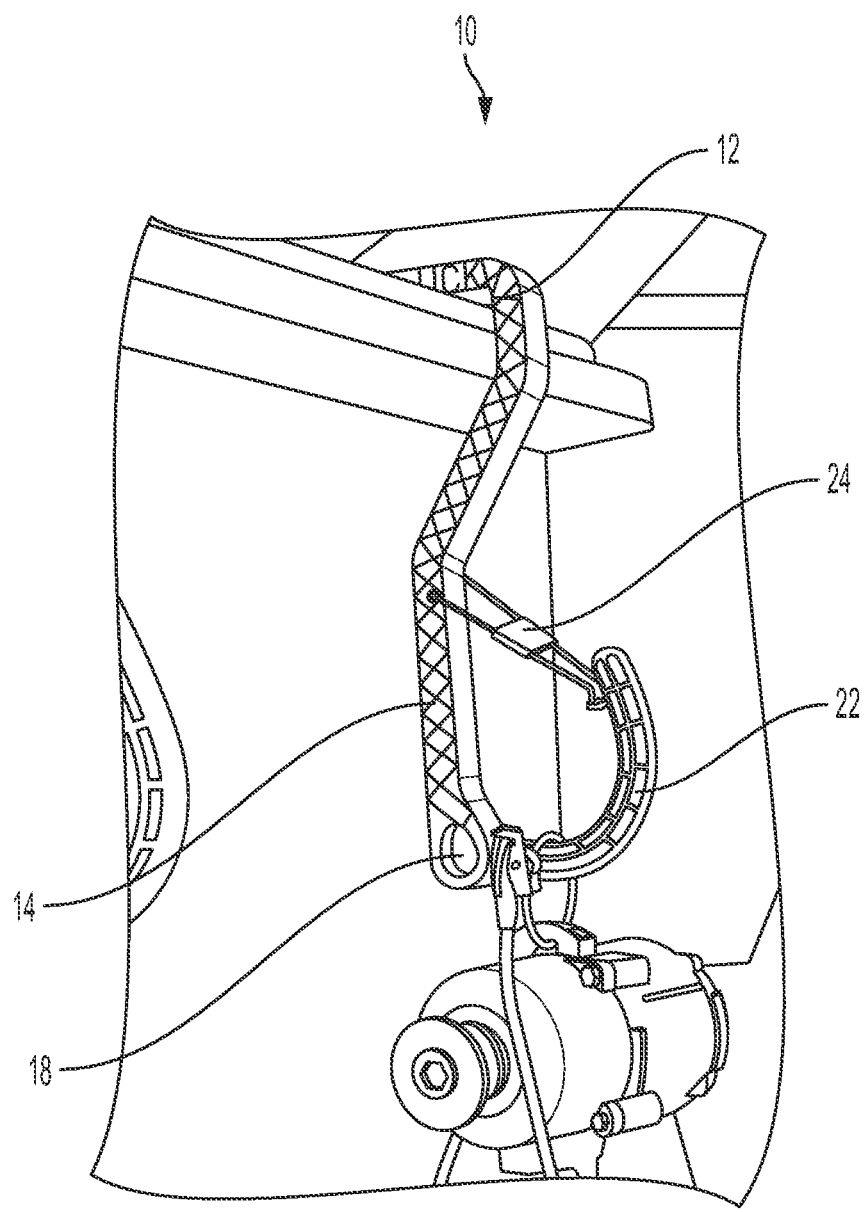
FIG. 6 is a perspective view of an example of a bucket hook with a tether hole in use on a bucket truck in accordance with an embodiment.
Figure 7:
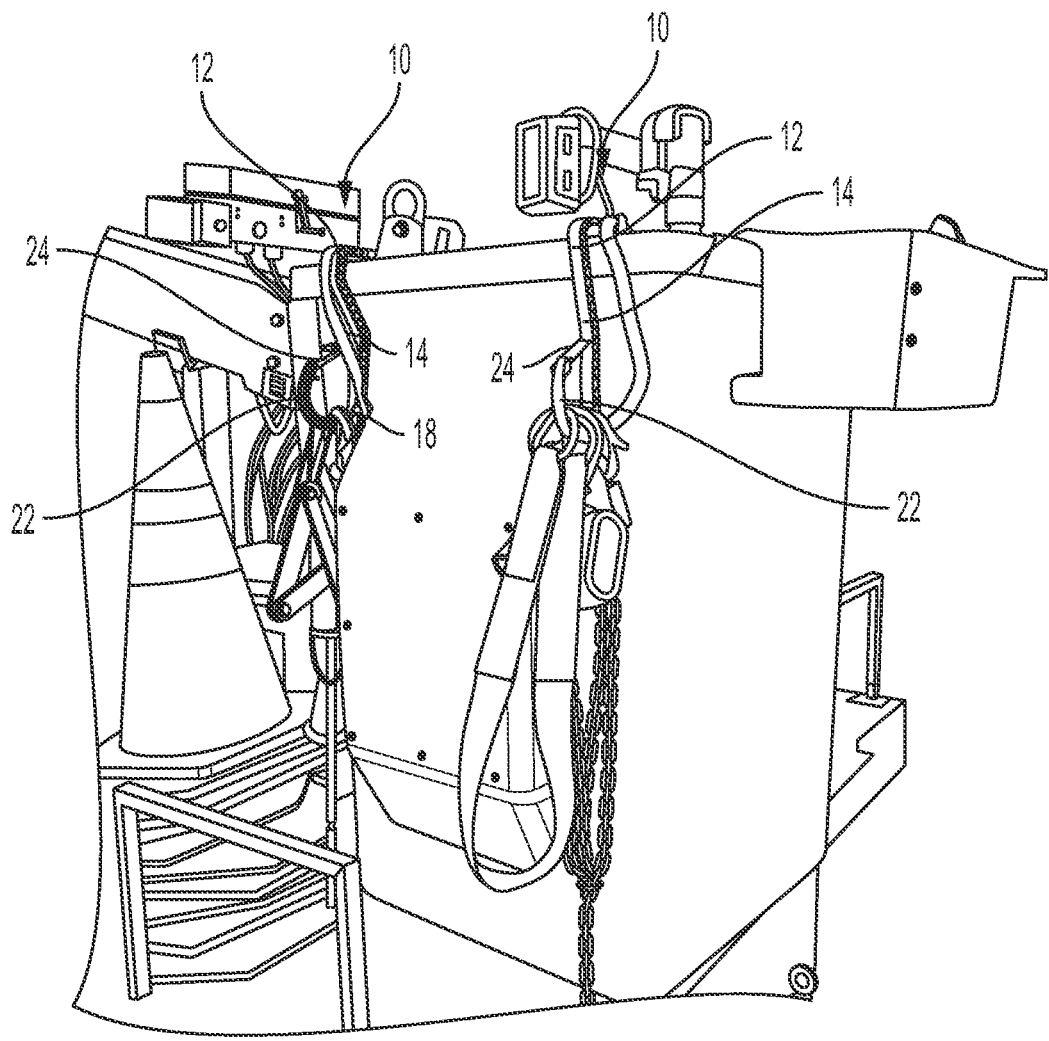
FIG. 7 is a perspective view of an example of a bucket hook with a tether hole in use on a bucket truck in accordance with an embodiment.
Figure 8:
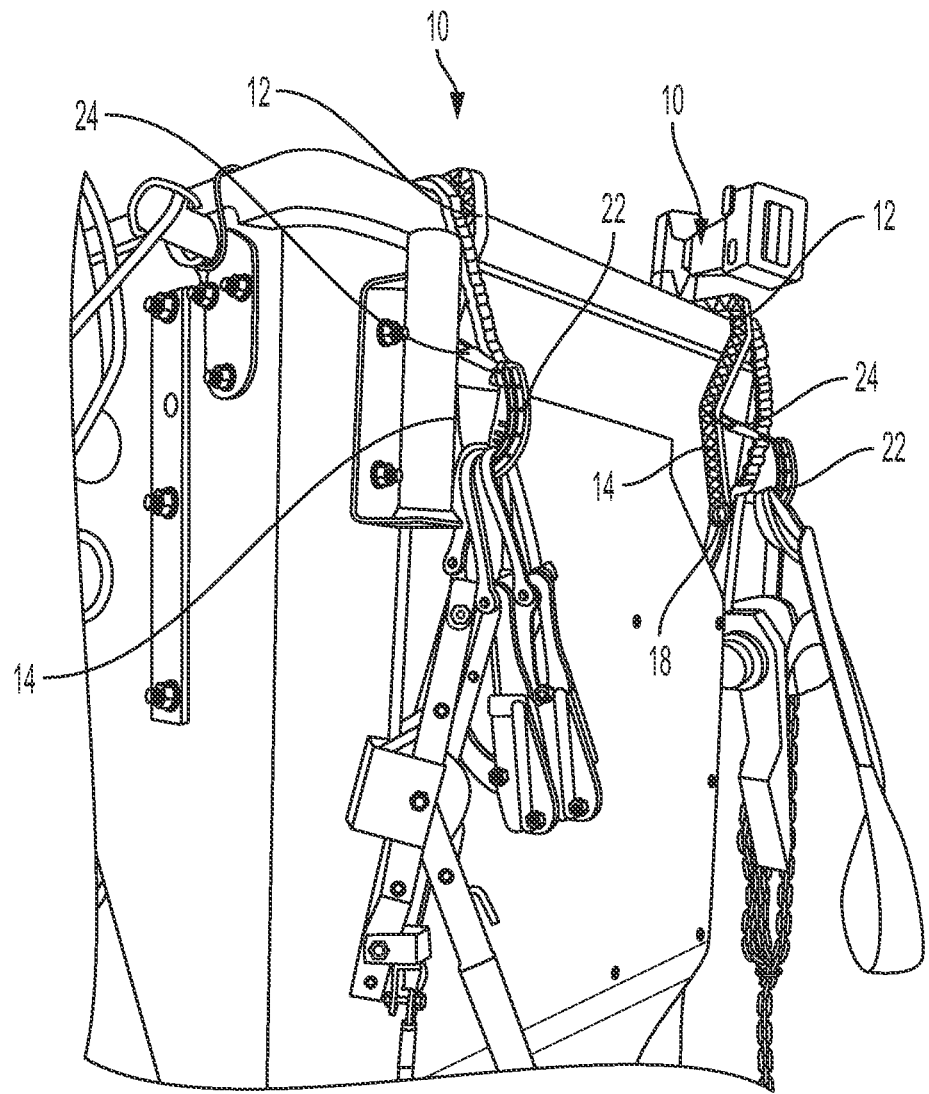
FIG. 8 is a perspective view of an example of a bucket hook with a tether hole in use on a bucket truck in accordance with an embodiment.
Figure 9:
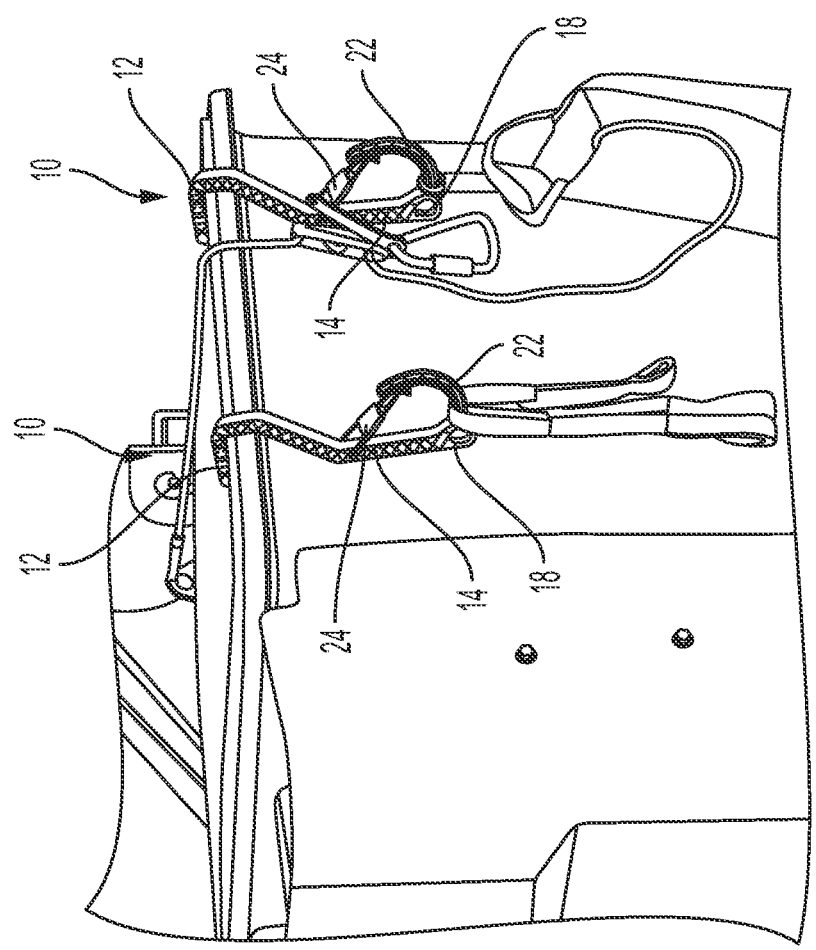
FIG. 9 is a perspective view of an example of a bucket hook with a tether hole in use on a bucket truck in accordance with an embodiment.
Figure 10:
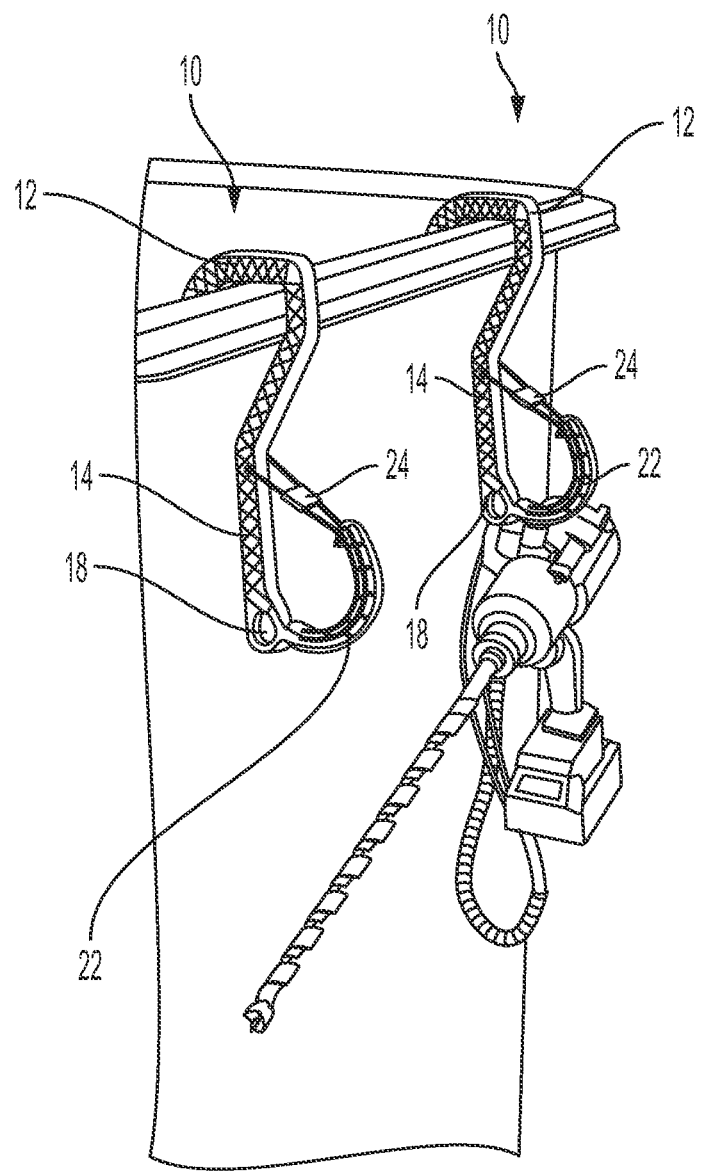
FIG. 10 is a perspective view of an example of a bucket hook with a tether hole in use on a bucket truck in accordance with an embodiment.

FIGS. 4 and 5 show examples of two bucket hooks 10 placed on a bucket of a bucket truck. In these examples the inside of a bucket is shown, and the second arm 16 of each bucket hook 10 is visible. The bucket hooks 10 shown have two accessory hooks 20 which are holding a variety of tools and accessories.

FIGS. 6-10 also show examples of bucket hooks 10 placed on a bucket of a bucket truck. In these figures the outside of the bucket is shown and first arms 14 are visible. As shown, the bucket hooks 10 in these figures include hole 28 formed by gate 24, second arm 14 and hook 22, which can hold tools and other objects in the hole 28.

In accordance with another embodiment, tether hole 18 can be rated as an ANSI 121 anchor attachment when properly attached to a bucket and when used with an ANSI 121 (American National Standard for Dropped Object Prevention Solutions) rated tool tether (as should be understood by a person of ordinary skill in the art in conjunction with a review of this disclosure). In addition, the tether hole 18 can hold up to 8 pounds of weight, with a tether that is up to 51 inches in length.

In accordance with a further embodiment, the bucket hook 10 can be about 10⅞ inches in height, 7¼ inches in width, ¾ inches thick, 7.4 ounces in weight, and made out of nylon. Hook 22 can be 1 1/16 inches in diameter, and hooks 20 can be ½ inches thick The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A bucket hook, comprising:
   a bucket receiving portion extending between a first end and a second end; and
   a first arm and a second arm extending from the first and second ends of the bucket receiving portion, respectively, in a first direction and at an angle to the bucket receiving portion, wherein the first arm and the second arm define a channel therebetween for receiving a portion of a bucket during use;
   a first hook extending distally from the second arm, away from the channel, and at least partially in a second direction opposite the first direction;
   a second hook extending distally from the first arm, away from the channel, and at least partially in the second direction; and
   a hole formed through the first arm or the second arm and extending through the first arm or the second arm in a third direction such that the hole does not extend toward the channel.

2. The bucket hook of claim 1, wherein the hole is formed at least partially by the first arm or the second arm.

3. The bucket hook of claim 1, further comprising a third hook extending from the second arm and at least partially in the second direction opposite the first direction, the third hook located at a different position on the second arm from the first hook.

4. The bucket hook of claim 1, wherein the first hook is of a different size than the second hook.

5. The bucket hook of claim 4, wherein the first hook is smaller than the second hook.

6. The bucket hook of claim 5, further comprising a gate pivotably attached to the first arm.

7. The bucket hook of claim 6, wherein the gate is pivotable between an open position and closed position.

8. The bucket hook of claim 1, wherein the first hook is configured to hold at least 15 pounds.

9. The bucket hook of claim 1, wherein the second hook is configured to hold at least 40 pounds.

\* \* \* \* \*